United States Patent
Metzger et al.

[19]

[11] Patent Number: 5,918,029
[45] Date of Patent: Jun. 29, 1999

[54] BUS INTERFACE SLICING MECHANISM ALLOWING FOR A CONTROL/DATA-PATH SLICE

[75] Inventors: Jeffrey A. Metzger, Leominster; Nitin D. Godiwala, Boylston; Barry A. Maskas, Sterling; Kurt M. Thaller, Acton; Paul M. Goodwin, Littleton; Donald W. Smelser, Bolton; David A. Tatosian, Stow, all of Mass.

[73] Assignee: Digital Equipment Corporation, Houston, Tex.

[21] Appl. No.: 08/999,899

[22] Filed: Sep. 8, 1997

Related U.S. Application Data

[63] Continuation of application No. 08/718,689, Sep. 27, 1996, abandoned.

[51] Int. Cl.[6] ............................. G06F 13/56; G06F 13/40
[52] U.S. Cl. .................................... 395/309; 395/308
[58] Field of Search ................................ 395/306, 309, 395/308

[56] References Cited

U.S. PATENT DOCUMENTS

| | | | |
|---|---|---|---|
| 4,370,709 | 1/1983 | Fosdick | 395/500 |
| 4,630,093 | 12/1986 | Kvis | 395/557 |
| 4,695,948 | 9/1987 | Blevins et al. | 395/306 |
| 4,825,438 | 4/1989 | Bennett et al. | 395/185.09 |
| 4,983,958 | 1/1991 | Carrick | 345/515 |
| 5,148,547 | 9/1992 | Kahle et al. | 395/800.22 |
| 5,155,843 | 10/1992 | Stamm et al. | 395/182.03 |
| 5,226,146 | 7/1993 | Milia et al. | 711/141 |
| 5,317,715 | 5/1994 | Johnson et al. | 395/842 |

*Primary Examiner*—Meng-Ai T. An
*Assistant Examiner*—John Follansbee
*Attorney, Agent, or Firm*—Hamilton, Brook, Smith & Reynolds, P.C.

[57] ABSTRACT

A bus interface is partitionable into at least two slices. Each slice interfaces a respective subset of data from a computer device to a system bus. Each slice also receives a corresponding subset of control information and a complete set of address information from the computer device. Moreover, each slice may be implemented on a single integrated circuit chip, which thus handles both data and control functions.

6 Claims, 4 Drawing Sheets

BUS INTERFACE SLICING MECHANISM ALLOWING FOR A CONTROL/DATA-PATH SLICE

This application is a continuation, of U.S. application Ser. No. 08/718,689, filed Sep. 27, 1996, now abandoned.

FIELD OF THE INVENTION

The present invention relates to computer system interfaces and, in particular, bus interfaces having a sliced design.

BACKGROUND OF THE INVENTION

Bus interfaces are used in computer systems to connect a common system bus to particular computer system elements, such as microprocessors, memory devices and input/output ("I/O") devices. The bus interface permits these elements to communicate with one another over the common system bus.

The computer system may contain a separate bus interface for each system element. In such a case, all signal lines between an element such as this and the system bus pass through the associated bus interface. The combination of a system element and its bus interface is often referred to as a module.

Bus interfaces may be implemented on an integrated circuit ("IC") chip. However, the number of pins on the interface IC chip for connection to computer elements is limited. For example, a bus interface IC chip may not have enough control and data input pins to receive all of the control and data signals output from a microprocessor.

The conventional approach to solving this problem has been to separate the design of the bus interface into multiple sections, or slices, with each slice handling either control functions or data-path functions. Typically, one slice, which is implemented on a single IC chip, handles all of the control functions, that is, receives all of the control signals from a microprocessor.

A slice for interfacing data paths may receive either the entire set of data signals or a subset of the data signals, for example, from a microprocessor. Once again, each slice is implemented on a single IC chip so that if one slice receives the entire set of data signals, only one IC chip is necessary. If, on the other hand, each slice receives a subset of the data signals, a number of IC chips are needed. Therefore, at least two unique designs are required to implement a bus interface using the conventional approach: one design is for control signals and one is for data-path signals. Because of the necessity of two different designs, design and manufacturing costs are relatively high.

Moreover, using this conventional approach, intermediate control lines are required to connect the control slice to each of the data-path slices. Also, circuits are needed for controlling the data-path slices and for providing proper synchronization between the control and data-path slices. Because each slice may be implemented on a separate IC chip, the intermediate control lines must leave the control slice IC chip and then connect to the data-path IC chip. Because this type of signal transmission is far slower than signal transmissions on a single IC chip, bus interface performance is not optimized for a given IC technology.

If a large number of data-path slices are used to implement a bus interface, the load on the intermediate control lines will be high. As a result, specially designed circuits are necessary for each design to manage this increased loading. This heavy loading also significantly reduces the performance of the bus interface. This reduction in performance is magnified as the size of the bus is increased in width. It is therefore very difficult to create a truly scalable bus interface.

The present invention solves these and other problems as set forth in the remainder of the specification and as shown in the accompanying drawings.

SUMMARY OF THE INVENTION

The present invention provides a bus interface that is partitionable into at least two slices. Each slice interfaces a separate subset of data from a computer element to the common system bus. Each slice also receives control information from the computer element and sends control information to the computer element in order to provide for independent operation of the individual slices. Inter-slice control signals between the slices ensure "lock-step" operation among the individual slices. Therefore, each slice of the bus interface according to the present invention handles both data and control functions, and can be implemented on a single IC chip. Accordingly, the bus interface of the present invention provides maximum performance for a given IC technology. Moreover, because only one IC design is required to implement a bus interface, the present invention provides a scalable and flexible slice design.

In a preferred embodiment of the present invention, the bus interface is partitioned into precisely two equally-divided slices: one slice handles the even-numbered data portions and the other slice handles the odd-numbered data portions from a microprocessor. A swizzling mechanism according to the present invention may be used to change the order of data from alternating odd and even portions on the microprocessor data bus to an odd and even-portion dichotomy on the common system bus. This is done to provide proper communications between various computer elements on the common system bus through the separate bus interfaces.

These and other features of the present invention will be described in detail in the remainder of the specification referring to the drawings.

DETAILED DESCRIPTION OF THE INVENTION

The present invention is a bus interface that may be implemented on a single IC chip. The bus interface of the present invention may be partitioned such that each slice interfaces a separate portion of the data paths of a computer system element.

Figure 1:
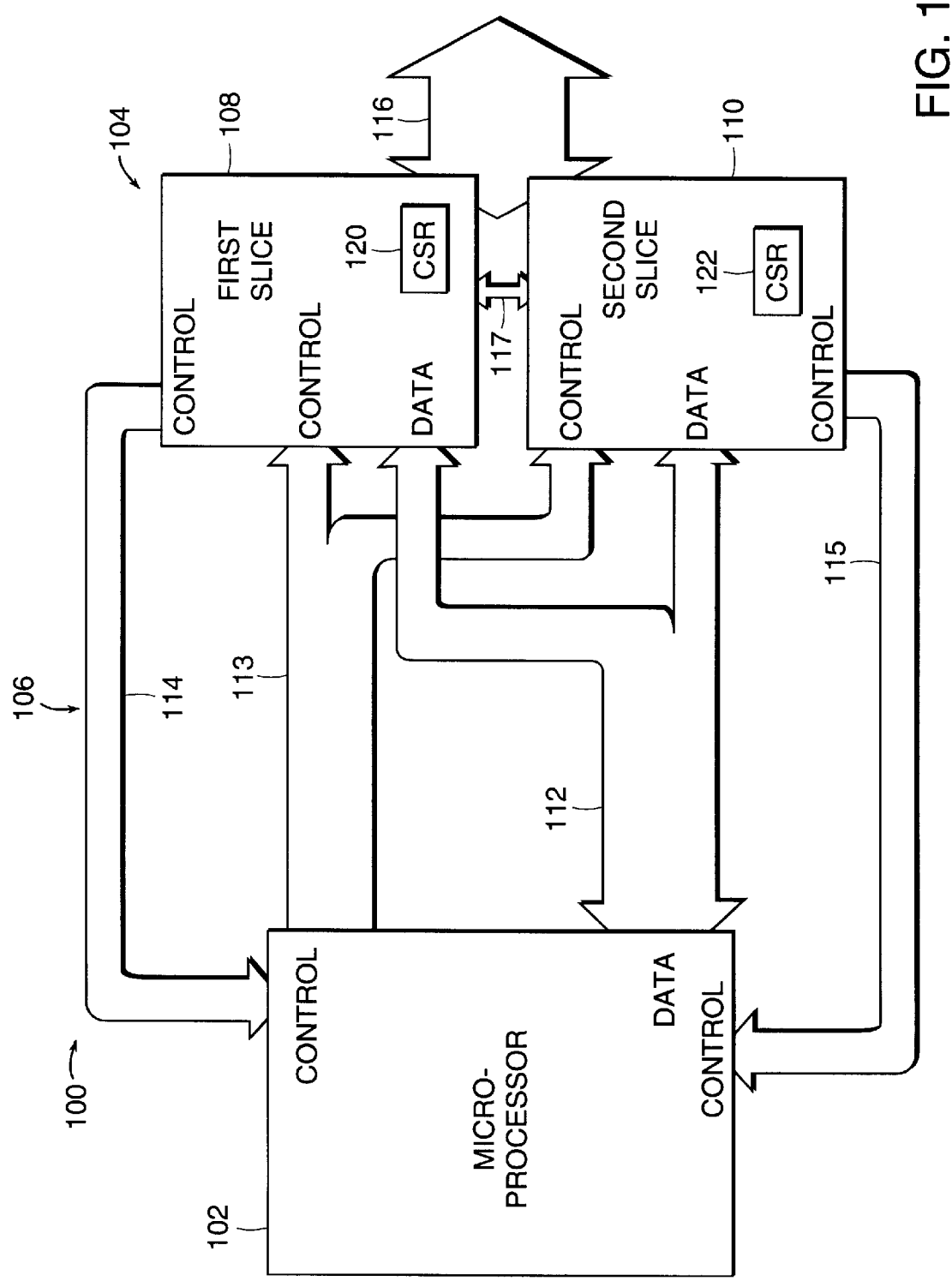
FIG. 1 shows a block diagram of a portion of a computer system employing a bus interface according to the present invention.

FIG. 1, shows a portion 100 of a computer system employing a bus interface according to the present invention. A processor, which is preferably microprocessor 102, is coupled to bus interface 104 over processor bus 106. Bus interface 104 includes two slices, first slice 108 and second slice 110 identical to first slice 108. Each slice is implemented on a single IC chip.

Processor bus 106 includes bi-directional data bus 112 and uni-directional control buses 113, 114 and 115. Data bus 112 carries one-half of the data of microprocessor 102 to first slice 108 and the other half of the data to second device 110. Control bus 113 carries a first portion of control signals (for example, data-mask signals) from microprocessor 102 to first slice 108. The first portion of control signals relates to the half of the data carried to first slice 108. Control bus 113 similarly carries a second portion of control signals from microprocessor 102 to second slice 110. The second portion of control signals relates to the half of the data carried to second slice 110. Hence, each slice independently handles one-half of the data.

Control bus 113 also carries certain other signals, such as the address information, from microprocessor 102 to both first slice 108 and second slice 110. Control buses 114 and 115 carry specialized control signals from the individual slices, slices 108 and 110, respectively, to microprocessor 102. Bi-directional inter-slice control bus 117 provides for communication between slices 108 and 110 in order to transfer status information and to synchronize the timing of the slices, and thus to ensure that both slices operate in "lock-step" fashion.

Each slice interfaces one-half of the data paths of microprocessor 102 to bi-directional computer system bus 116, which is coupled to the slices. System bus 116 couples microprocessor 102 to additional computer system elements, such as memory devices, I/O devices, and/or other processors.

When microprocessor 102 needs the use of system bus 116, only one of the slices requests system bus 116. However, both slices will recognize the time at which system bus 116 is granted to microprocessor 102, thus allowing the slices to operate in "lock-step" fashion.

As an example, which is not meant to limit the present invention in any way, microprocessor 102 may have 128 data pins to support data bus 112 of 128 lines. In such a case, 64 lines of data bus 112 carry, for example, even-numbered portions of data to and from the corresponding 64 pins of first slice 108. The other 64 lines of data bus 112 carry, for example, odd-numbered portions of data to and from the corresponding 64 pins of second slice 110.

If microprocessor 102 has, for example, 32 address pins, control bus 113 would couple all 32 address pins to each of 32 pins of first slice 108 and 32 pins of second slice 110.

System bus 116 may be a bi-directional, multiplexed, 128-line address/data bus. As such, 64 lines of system bus 116 may carry the even-numbered data portions to and from the corresponding 64 pins of first slice 108, and the other 64 lines of system bus 116 may carry the odd-numbered data portions to and from the corresponding 64 pins of second slice 110. In this manner, each of two slices, slices 108 and 110, can simultaneously place as many as 64 bits of data from microprocessor 102 via data bus 112 or 32 bits of address from microprocessor 102 via control bus 113 on system bus 116 for transmission to other computer system elements coupled to system bus 116.

Because each slice, and thus each IC chip, receives corresponding control information from the microprocessor, all of the functions required to control and drive a separate subset of data onto the system bus reside on the same IC chip. Therefore, the slow intermediate control signals transmitted off a control chip and onto each data-path chip of a conventional bus interface (for driving data through the data-path chips) are no longer necessary. As a result, performance is optimized for a given IC technology.

Although the bus interface of the present invention has been illustrated in conjunction with a single microprocessor, it is to be understood that the bus interface can be used with any computer system element coupled to the system bus. Regardless of the particular computer system element interfaced to the system bus, each slice of the bus interface is essentially identical, and therefore only one type of IC design is required to implement the complete bus interface. Thus, if the width of the system bus is increased, the width of the bus interface of the present invention can simply be increased with it by adding additional slices, and yet only a single bus interface design is required. Therefore, the bus interface of the present invention is scalable.

Figure 2:
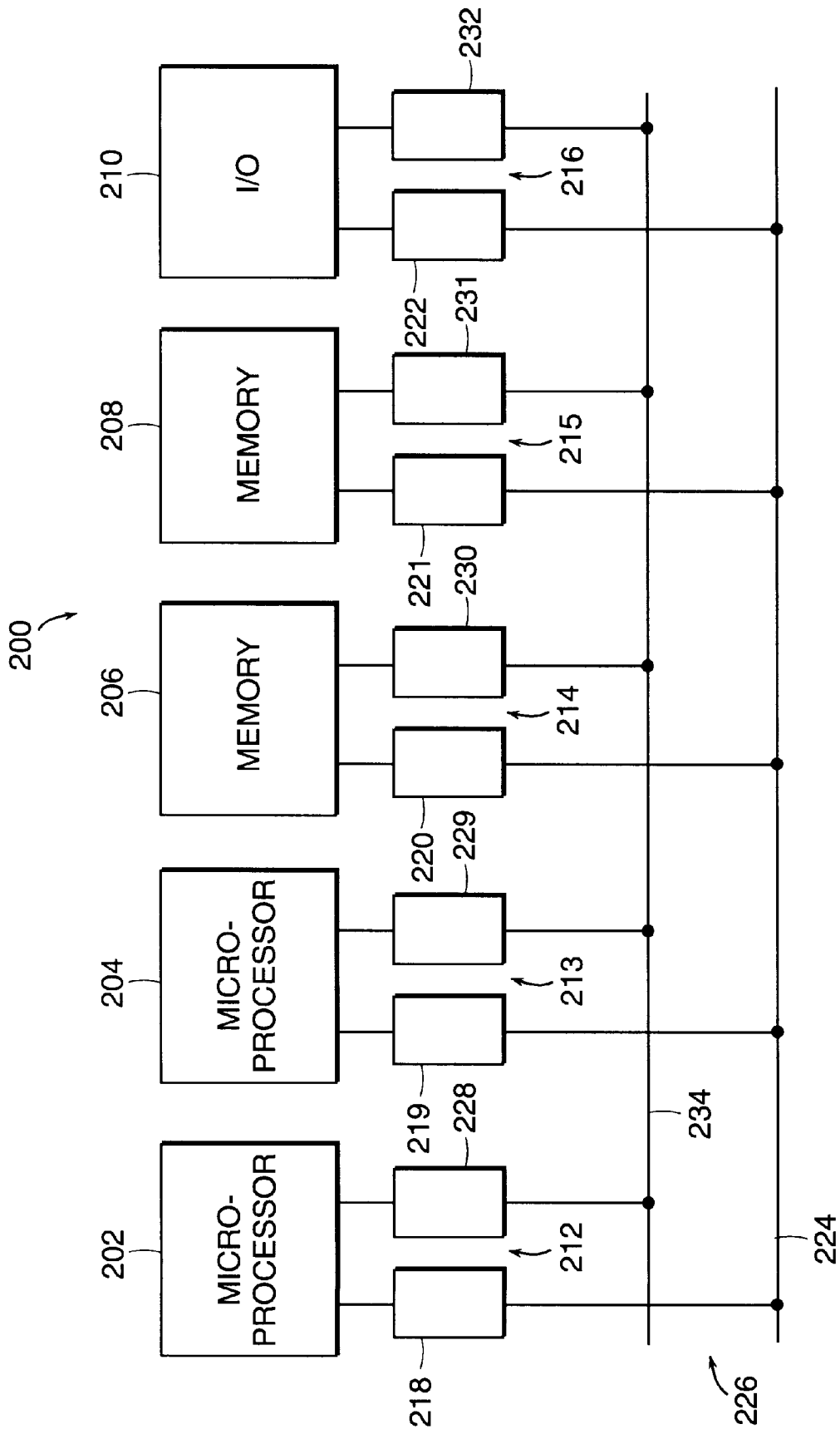
FIG. 2 shows a block diagram of a computer system having multiple devices and corresponding bus interfaces according to the present invention.

FIG. 2 shows a portion 200 of a computer system which includes several computer system elements and bus interfaces according to the present invention associated with each element. In particular, the computer system includes microprocessors 202 and 204, main memory devices 206 and 208, and I/O device 210. Each of these elements is connected to a bus interface. Microprocessor 202 connects to bus interface 212, microprocessor 204 to bus interface 213, memory 206 to bus interface 214, memory 208 to bus interface 215, and I/O device 210 to bus interface 216.

First slices 218, 219, 220, 221, and 222 of bus interfaces 212, 213, 214, 215, and 216, respectively, couple to first portion 224 of system bus 226. Similarly, second slices 228, 229, 230, 231, and 232 of bus interfaces 212, 213, 214, 215, and 216, respectively, couple to second portion 234 of system bus 226.

Although each of the bus interfaces shown in FIGS. 1 and 2 is partitioned into two identical slices, it is to be understood that a bus interface can be partitioned into N identical slices, where the maximum value of N is the lesser of the values determined by the following expressions:

$$N_1 = \frac{\text{Number of Bits in the Largest Atomic Write}}{\text{Number of Bits in the Largest Control and Status Register ("}CSR\text{") in the Bus Interface}} \quad (1)$$

and $$N_2 = \frac{\text{Number of Bits in the System Bus}}{\text{Number of Bits in a Command/Address Portion of a Cycle of a Data Transfer over the System Bus}} \quad (2)$$

An example will now be provided to illustrate a determination of the maximum value for N. With respect to the first expression, a microprocessor may be capable of performing at most a 32-bit write in a single transaction over the processor bus. This is commonly referred to as an atomic write. The largest width of a Control and Status Register ("CSR") in the bus interface may be 16 bits. The CSR (as shown at 120 and 122 in FIG. 1) is the register in the bus interface which determines the characteristic behavior of the bus interface and can be written to by the microprocessor only in a single transaction, as will be discussed below. In such a case, $N_1$=34 16=2. Therefore, the bus interface can be divided into at most two slices because the slices must be able to simultaneously receive 16 bits of CSR information (e.g., a CSR update) from a microprocessor that can write only 32 bits in a single transaction. That is, the microprocessor can provide two identical 16-bit pieces of CSR information, one for each slice, but no more. As such, each slice will always receive identical CSR information at the same time, thus maintaining a coherent control state for the complete bus interface.

With respect to the second expression, a system bus, operated as a multiplexed command/address and data bus, may have the command/address information driven in a first cycle of a data transfer over the bus. The command indicates the type of transfer (read, write, etc.), while the address indicates the location of the data reference. If the system bus is 128 bits wide and the command/address information is, for example, 32 bits wide, $N_2=128 \div 32=4$. Since each slice of the bus interface must receive the full command/address information at the same time and since this 32-bits of information can be replicated over the 128-bit bus at most four times, the bus interface can be partitioned into at most four slices based upon the value of $N_2$ that was just calculated.

However, because N equals the lesser of $N_1$ and $N_2$, N equals two ($N_1$), not four ($N_2$), in this case. Thus, under the above circumstances, the bus interface can be partitioned into at most two slices.

The bus interface of the present invention uses three mechanisms to manage the interface. These are the bus swizzle, position-dependent behavioral modification, and inter-slice communication management.

Bus Swizzle

Figure 3A:
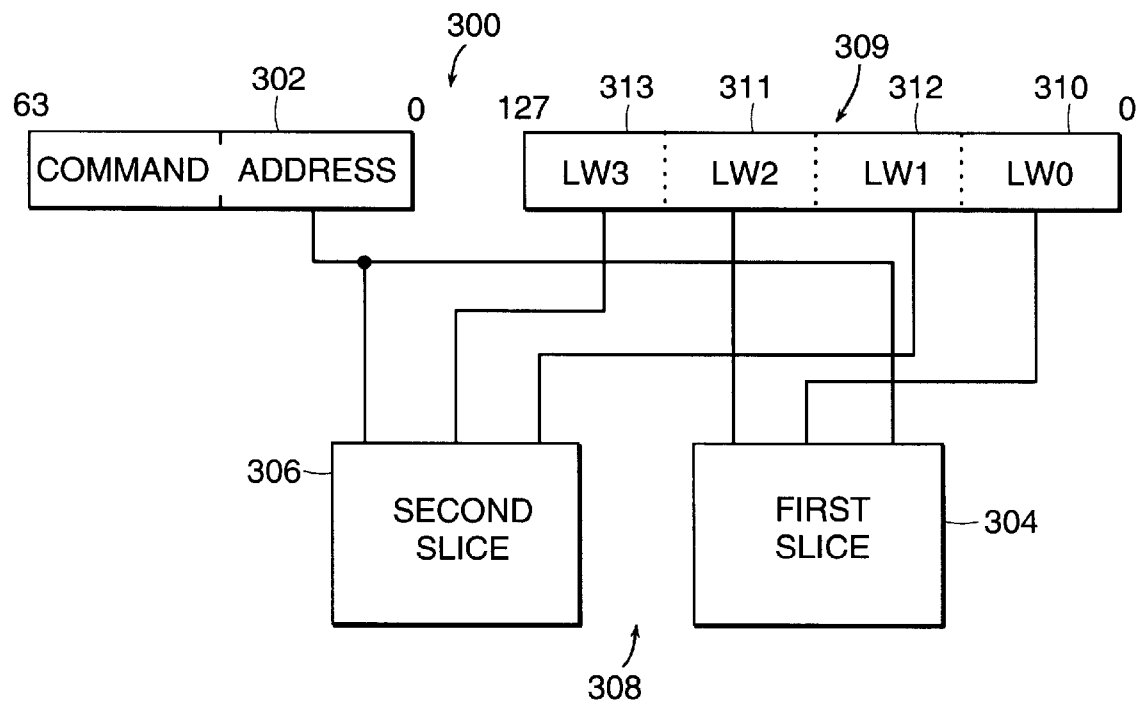
FIG. 3a, 3b and 3c illustrate a bus swizzling mechanism according to the present invention.
Figure 3B:
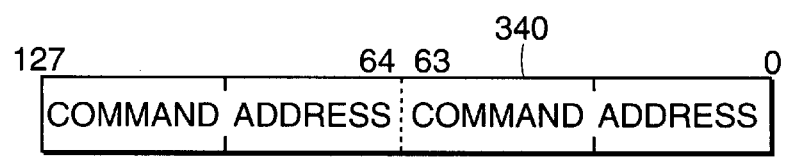

The control bus carries a corresponding portion of control information and a complete set of command/address information from the microprocessor to each of the slices of the bus interface. FIG. 3A, shows a portion 300 of control bus 302 which carries a 64-bit command/address from the microprocessor to both first slice 304 and second slice 306 of bus interface 308. Each slice transmits this same 64-bit command/address onto the system bus during an address cycle of a transfer. As a result, as shown in FIG. 3B, the 128-bit system bus 340 contains a replicated 64-bit command/address for the corresponding two slices of the bus interfaces associated with the other devices on the bus.

As set forth above, and as shown in FIG. 3A, unlike control bus 302, the even-numbered data portions 310 and 311 of data bus 309 are input to first slice 304 and the odd-numbered data portions 312 and 313 of data bus 309 are input to second slice 306.

Referring to FIG. 3A, data bus 309 may be 123 bits wide, and may consist of four 32-bit wide data longwords. The two even-numbered longwords LW0 at 310 and LW2 at 311 are transmitted to first slice 304 and the two odd-numbered longwords LW1 at 312 and LW3 at 313 are transmitted to second slice 306. Each slice receives two longwords, or a quadword.

Figure 3C:
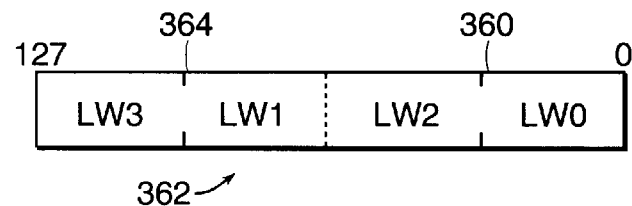

Referring to FIG. 3C, the effect of swizzling at the slices is graphically shown. When data longwords are "swizzled" in the slices and placed on the system bus, the even-numbered portions LW0 at 310 and LW2 at 311 are placed on half 360 of the 128-bit system bus 362 during the data cycle of a transfer, while the odd-numbered portions LW1 at 312 and LW3 at 313 are placed on the other half 364 of system bus 362. As such, the order of the data is changed from alternating odd and even portions on the microprocessor data bus to an odd and even-portion dichotomy on the system bus, as can be readily seen from a comparison of FIG. 3A to FIG. 3C. In this manner, half 360 of system bus 362 contains the even-numbered data portions LW2, LW0 and transmits this data to the first slice of each bus interface of the system bus. Similarly, half 364 of the system bus 362 contains the odd-numbered data portions LW3, LW1, and transmits this data to the second slice of each bus interface on the system bus. Therefore, during a data read or write, while all even-numbered data portions pass through the first slices, all odd-numbered data portions simultaneously pass through the second slices.

The swizzling technique is equally applicable if the bus interfaces are partitioned into a larger number of slices, or if the slices are not the same size.

The swizzling technique provides a particular advantage when writing to CSRS. As discussed above, each slice contains a CSR which determines the characteristic behavior of the bus interface. When the microprocessor wants to modify the current behavior of the bus interfaces, the microprocessor may simultaneously send CSR data to each of the slices of the bus interfaces to simultaneously update all of the CSRs.

For example, in a situation where there are two-slice bus interfaces with each slice containing a 32-bit CSR, in order for the microprocessor to update the CSRs, the microprocessor simultaneously sends two longwords over a 64-bit portion of the system bus, one longword for each first slice and the other longword for each second slice. This method of update ensures synchronization of the slices, and thus provides for a "lock-step" operation.

In systems of the prior art, on the other hand, in order to update the behavior of a bus interface, the microprocessor must write CSR data to the control slice, possibly via the data slice and thus, in this case, requiring two separate transfers. Therefore, the method of updating the CSRs according to the present invention involves fewer data transfers, and thus is faster and more reliable.

Figure 4:
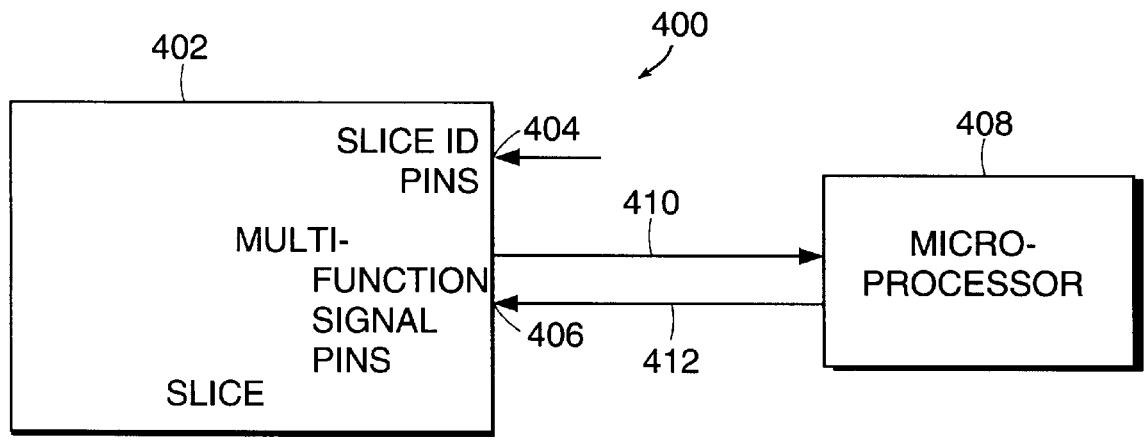
FIG. 4 illustrates a position-dependent behavioral modification mechanism according to the present invention.

Position-Dependent Behavioral Modification FIG. 4 shows a portion 400 of the bus interface such that each slice 402 of the bus interface preferably contains both slice Identification pins 404 and multi-function signal pins 406. The slice Identification pins 404 are used at device power-up to input signals identifying the individual slice. This is so the slice knows which element of the system it is interfacing to the system bus (for example, microprocessor 408), and the position of the slice relative to the other slices within the particular bus interface (for example, the second slice of four slices), as well as the particular, specialized control functions for which the slice is responsible (for example, asserting an "invalidate internal data cache" control signal). The slices perform their respective control functions in parallel fashion.

The multi-function signal pins 406 are used during normal operation to convey particular control information consistent with the slice's identification (for example, an "invalidate internal data cache" signal sent to microprocessor 408 over control line 410), for example, in response to a request signal from the microprocessor over control line 412.

Figure 5:
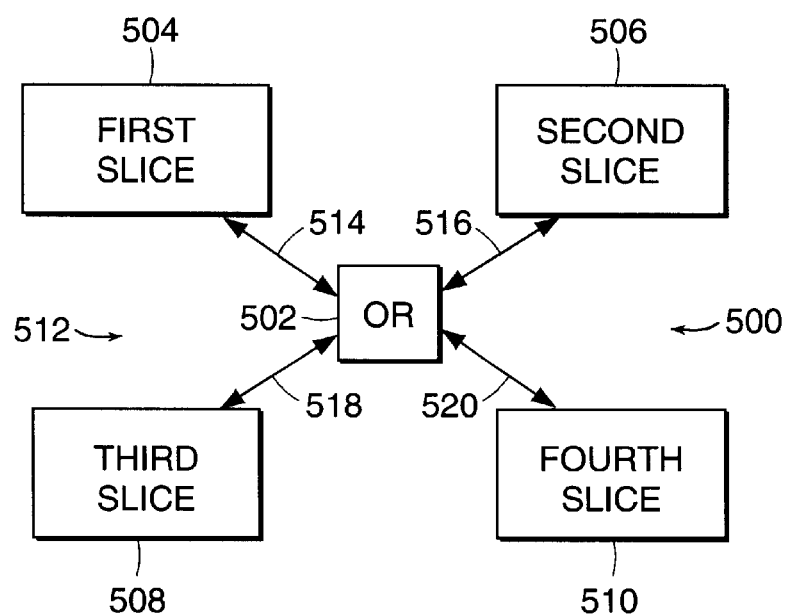
FIG. 5 illustrates an inter-slice communication management mechanism according to the present invention.

By using the position-dependent behavioral modification mechanism, many interface signals appear as though they were transmitted from a unique control-only slice, although they are actually transmitted from multi-function signal pins on a bus interface slice according to the present invention. Inter-Slice Communication Management FIG. 5, generally at 500, shows bi-directional open drain lines 514, 516, 518, and 520 connecting a wired-OR gate 502 to a pin on slices 504, 506, 508, and 510, respectively, of bus interface 512. This arrangement is used to facilitate error recognition. Because of the operation of the wired-OR gate 502, the open drain lines carry to the slices a signal having a non-asserted state only when the signal at every pin is at a non-asserted state, indicating that none of the slices has recognized an error. If, on the other hand, a signal at any one or more of the pins is at an asserted state, the lines would carry to the slices a signal having an asserted state, which indicates that at least one of the slices has recognized an error, for example, a parity error. Therefore, each slice is capable of causing the line to attain the asserted state, and thus indicate an error to all of the other slices of the particular bus interface.

All of the slices of a given bus interface monitor their respective external line to determine if any slice has recognized an error, instead of simply relying upon their own, internal recognition of an error. Each slice drives its line in a particular cycle based upon its own recognition of an error, and then receives the wired-OR signal from the line in the following cycle. However, only one of the slices is responsible for storing a detected error in its CSR for access by the microprocessor.

A limited number of inter-slice signals is required to recognize errors in the bus interface. Moreover, when error conditions occur and a slice deviates from normal operation, all of the other slices can continue to operate in lock-step fashion.

The terms and expressions which are employed herein are used as terms of expression and not of limitation. And, there is no intention, in the use of such terms and expressions, of excluding the equivalents of the features shown, and described, or portions thereof, it being recognized that various modifications are possible-within the scope of the invention.

What is claimed is:

1. A bus interface for interfacing a computer element to a computer system bus, comprising:

a plurality of slices, each slice being capable of interfacing both control information and a respective portion of data information passing between the computer element and the computer system bus, wherein half of said plurality of slices interfaces even-numbered portions of data information, and the other half of said plurality of slices interfaces odd-numbered portions of data information, wherein the computer element is a microprocessor, each slice receiving the respective portion of data information from the microprocessor over a microprocessor data bus, each slice receiving a corresponding portion of control information from the microprocessor over the microprocessor control bus, and each slice containing a Control and Status Register (CSR) for controlling the behavior of the respective slice and wherein the number of slices is at least as small as the lesser of the values determined by the following expressions:

a number of bits in a largest single write operation by the microprocessor divided by a number of bits in a largest CSR contained in the bus interface, and a number of bits in the computer system bus divided by a number of bits in a command/address portion of a data transfer over the computer system bus.

2. The bus interface according to claim 1, wherein the control information includes address information.

3. The bus interface according to claim 2, wherein each slice of said plurality of slices receives an entire set of address information from the computer element.

4. The bus interface according to claim 1, wherein each slice of said plurality of slices is contained on a separate integrated circuit chip.

5. The bus interface according to claim 4, wherein each chip contains at least one slice identification (ID) pin for identifying individual slices.

6. The bus interface according to claim 1, further comprising a wired OR-gate coupled to all of the said plurality of slices for recognizing errors in the bus interface.

* * * * *